United States Patent
Davis et al.

(10) Patent No.: US 7,029,190 B1
(45) Date of Patent: Apr. 18, 2006

(54) BRAILLE INPUT DEVICE

(75) Inventors: Bradley S. Davis, Indian Shores, FL (US); Lee Hamilton, Tampa, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 10/711,459

(22) Filed: Sep. 20, 2004

Related U.S. Application Data

(60) Provisional application No. 60/504,289, filed on Sep. 19, 2003.

(51) Int. Cl.
*B41J 5/08* (2006.01)

(52) U.S. Cl. .................. 400/483; 400/489; 341/21; 434/114; 383/114

(58) Field of Classification Search ........ 400/472, 400/483, 489; 434/114; 382/114; 341/21, 341/22, 23
See application file for complete search history.

(56) References Cited

U.S. PATENT DOCUMENTS

| | | | | |
|---|---|---|---|---|
| 4,044,350 A | * | 8/1977 | Tretiakoff et al. | 340/407.2 |
| 4,522,518 A | * | 6/1985 | Schmidt | 400/486 |
| 4,985,692 A | * | 1/1991 | Breider et al. | 340/407.2 |
| 5,557,269 A | * | 9/1996 | Montane | 341/22 |
| 6,128,671 A | * | 10/2000 | Weijand | 710/5 |
| 6,163,280 A | * | 12/2000 | Breider | 341/21 |
| 6,542,623 B1 | * | 4/2003 | Kahn | 382/114 |
| 6,639,510 B1 | * | 10/2003 | Soulie | 340/407.2 |
| 6,712,613 B1 | * | 3/2004 | Depta | 434/114 |
| 6,827,512 B1 | * | 12/2004 | Souluer | 400/483 |
| 6,943,776 B1 | * | 9/2005 | Ehrenburg | 345/168 |
| 2003/0122689 A1 | * | 7/2003 | Romeo et al. | 341/21 |
| 2005/0079472 A1 | * | 4/2005 | Shimamura et al. | 434/114 |

FOREIGN PATENT DOCUMENTS

| | | | | |
|---|---|---|---|---|
| JP | 06043803 A | * | 2/1994 | |
| JP | 10301685 A | * | 11/1998 | |
| JP | 2003241646 A | * | 8/2003 | |
| WO | WO 2004047050 A1 | * | 6/2004 | |

\* cited by examiner

*Primary Examiner*—Daniel J. Colilla
*Assistant Examiner*—Dave A. Ghatt
(74) *Attorney, Agent, or Firm*—Smith & Hopen, P.A.; Ronald E. Smith

(57) ABSTRACT

A Braille input device includes eight keys for entering dot information that forms a Braille character. The device further includes a space key and eight function keys, with a separate function key arranged above each dot key. This allows a user to rapidly and accurately select any desired function key without removing his or her hands from the Braille keyboard. A cursor router key and a Braille display including a plurality of Braille cells may also be provided.

2 Claims, 2 Drawing Sheets

BRAILLE INPUT DEVICE

CROSS-REFERENCE TO RELATED APPLICATION

This application claims priority from U.S. provisional application Ser. No. 60/504,289 filed Sep. 19, 2003.

BACKGROUND OF THE INVENTION

1. Field of the Invention

This invention relates, generally, to devices that help low vision and unsighted persons to read. More particularly, it relates to a Braille input device having a keyboard that includes dot keys, function keys and a cursor control key.

2. Description of the Prior Art

Blind and low vision persons frequently use Braille as a means of writing and reading text. Braille characters are generated by selective activation of eight dots arranged in two parallel columns of four dots each.

Various digital devices are available for entering Braille text into a computer memory and for displaying the stored text. A typical Braille keyboard includes two sets of four dot keys per set and a space key. In some keyboards, a cursor router key is provided for navigating through stored text.

A Braille keyboard may be a stand alone peripheral device for connecting to a microcomputer, or it may be formed as an integral part of a computer.

A notetaker is a portable computer used by blind and low vision students. The notetaker includes a keyboard for inputting text data and a memory for storing data. The notetaker also may include a programmed computer that converts stored text to an audio output so that the user can hear the stored text. It may also include a Braille display to allow a user to read the text. The Braille display has a row of cells, each of which displays one character of stored text by selectively raising pins to form the dots for the character displayed.

Function keys are provided for selecting different functions in a standard QWERTY computer keyboard. Similar function keys have not been available for Braille keyboards.

Accordingly, there is a need for a Braille input device including a keyboard having function keys.

However, in view of the prior art considered as a whole at the time the present invention was made, it was not obvious to those of ordinary skill in the art that an improved Braille keyboard was needed, nor was it obvious how the need could be fulfilled if it had been perceived.

SUMMARY OF THE INVENTION

The long-standing but heretofore unfulfilled need for an improved Braille input device includes a notetaker having a plurality of dot keys for inputting dot information that forms Braille characters. At least one function key is positioned in close proximity to a preselected dot key of the plurality of dot keys. The at least one function key is positioned adjacent and above the preselected dot key to facilitate location of the at least one function key.

In a preferred embodiment, the plurality of dot keys includes eight keys. The eight keys are grouped into a left-hand group of four keys and a right-hand group of four keys. Each of the eight function keys is positioned adjacent and above an associated dot key.

In a second embodiment, at least one cursor router key is disposed in proximity to the plurality of dot keys. The at least one cursor router key may be disposed at any suitable location on the notetaker but is preferably positioned between the left-hand group of four keys and the right-hand group of four keys so that the user can easily locate it.

The primary advantage of this invention is that it equips a Braille input device such as a notetaker with at least one function key.

Another advantage is that it positions the at least one function key in a location where it is easily found by an unsighted or low vision user.

Another advantage is that equips a Braille input device with at least one cursor control key and positions said at least one cursor control key in a location that is easy to find by an unsighted or low vision user.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
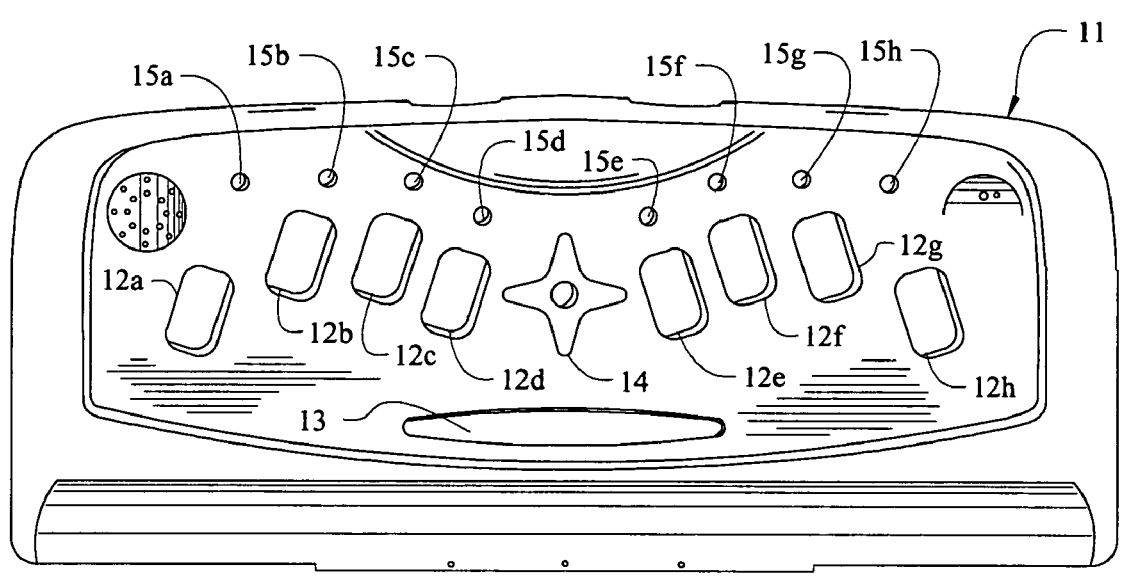
FIG. 1 is a top plan view of a Braille input device equipped with a plurality of function keys and a cursor control key.

Referring now to FIG. 1, it will there be seen that an illustrative embodiment of the invention is denoted as a whole by the reference numeral 10. Braille input device 10 includes a conventional notetaker 11. However, this invention has utility with all Braille input devices, not just notetaker 11.

Dot keys 12a–12d form a left hand group and dot keys 12e–12h form a right hand group for activation with the corresponding fingers of the left and right hands, respectively. Space key 13 is centered below the two groups of keys 12a–12h and a cursor router key 14 is positioned between the two groups of keys. More than one cursor router key 14 may be provided.

In this illustrative embodiment, function key 15a is positioned adjacent and above dot key 12a, function key 15b is positioned adjacent and above dot key 12b, function key 15c is positioned adjacent and above dot key 12c, function key 15d is positioned adjacent and above dot key 12d, function key 15e is positioned adjacent and above dot key 12e, function key 15f is positioned adjacent and above dot key 12f, function key 15g is positioned adjacent and above dot key 12g, and function key 15h is positioned adjacent and above dot key 12h. Thus, a separate function key 15a–15h is respectively positioned adjacent and above each dot key 12a–12h.

This invention requires that at least one function key be provided in association with at least one dot key. This invention does not require that each dot key have a corresponding function key, but such structure is preferred.

Each function key may have a dedicated function. In the alternative, each function key may be programmable.

The positioning of each function key adjacent and above a different dot key enables a user to quickly locate and depress a desired function key without having to remove the hands from the Braille keyboard. More particularly, a user operates dot keys 12a–d and function keys 15a–d with the left hand and dot keys 12e–h and function keys 15e–h with the right hand. Advantageously, each function key has a small, point-like structure to distinguish it from the flat, generally rectangular structure of its associated dot key. Moreover, a space is provided between each dot key and its associated function key. More particularly, each function key is disposed above and in spaced apart relation to its associated dot key as depicted. The left-hand dot keys 12a–d are aligned substantially in side-by-side relation to one another in a single left row, and the right-hand dot keys 12e–h are also aligned substantially in side-by-side relation to one another in a single right row. The single left row and the single right row are in side-by-side alignment with one another. Cursor router key 14 is positioned between the left-band and right-hand dot keys as mentioned above, and is also in the same row as said left-hand and right-hand dot keys. In this way, cursor router key 14 is equally accessible by a user's left hand or right hand, there being no need for a user to reach above or below said single row of dot keys to gain access to said cursor router key.

Figure 2:
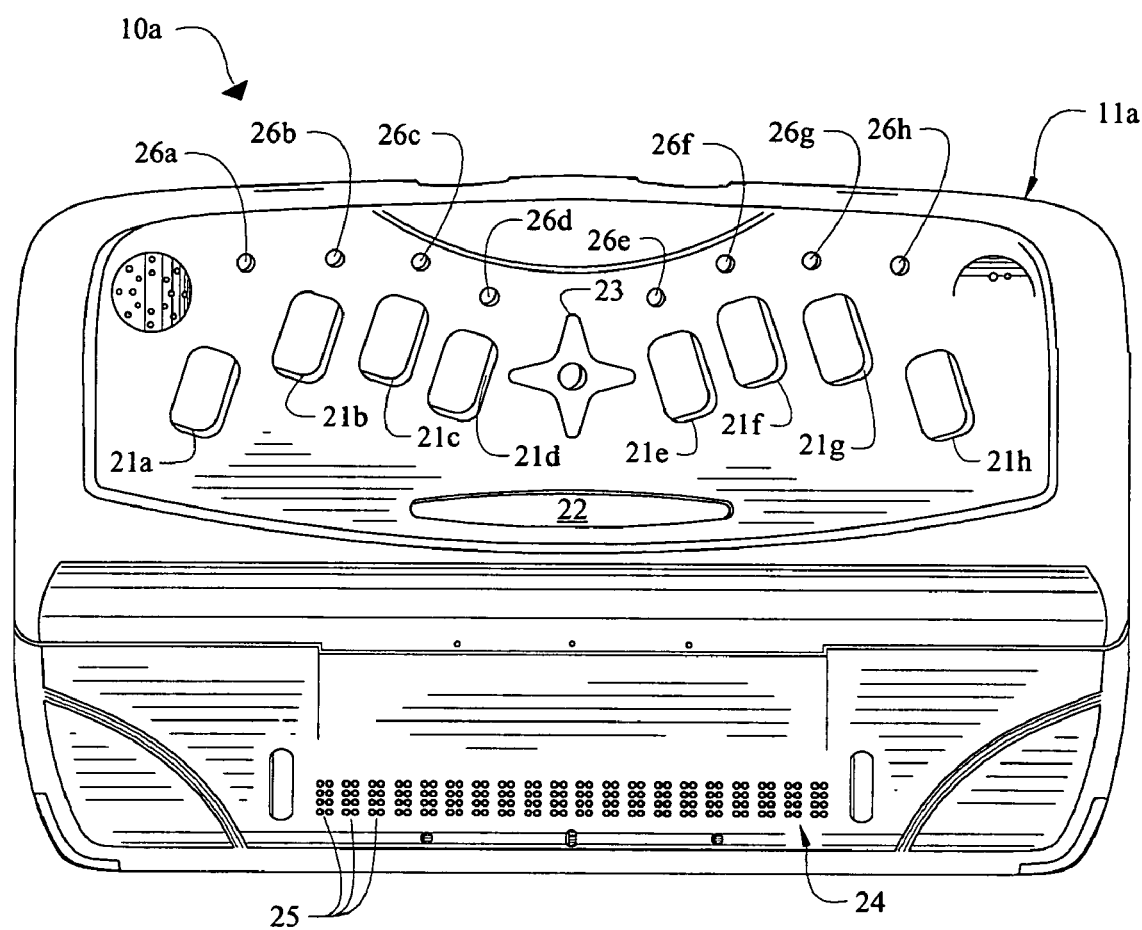
FIG. 2 is a top plan view of the Braille input device of FIG. 1 further equipped with a Braille display.

A second embodiment of the invention is depicted in FIG. 2 and is denoted as a whole by the reference numeral 10a. Notetaker 11a includes a conventional Braille keyboard having eight dot keys 21a–21h, a space bar key 22, a cursor router key 23, Braille display 24, and function keys 26a–h.

Braille display 24 includes a number of Braille cells 25 arranged in a row, with each Braille cell 25 forming a different character in a line of text.

Function key 26a is preferably located adjacent and above dot key 21a, function key 26b is preferably located adjacent and above dot key 21b, function key 26c is preferably located adjacent and above dot key 21c, function key 26d is preferably located adjacent and above dot key 21d, function key 26e is preferably located adjacent and above dot key 21e, function key 26f is preferably located adjacent and above dot key 21f, function key 26g is preferably located adjacent and above dot key 21g, and function key 26h is preferably located adjacent and above dot key 21h.

During use, Braille display 24 is closest to a user's body. A user operates dot keys 21a–d and function keys 26a–d with the left hand and dot keys 21e–h and function keys 26e–h with the right hand.

As used herein, the term "above" in identifying the preferred location for the function keys means that the function keys are spaced further from the user than the dot keys, or nearer the top of FIGS. 1 and 2.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described, What is claimed is:

1. A Braille input device, comprising:
   a left-hand group of four dot keys aligned substantially in side-by-side relation to one another in a single left row and a right-hand group of four dot keys aligned substantially in side-by-side relation to one another in a single right row, said single left row and said single right row being in substantial left-to-right alignment with one another for inputting dot information for forming Braille characters;
   each dot key of said left-hand group and each dot key of said right-hand group having a flat, generally rectangular structure;
   a left-hand group of four function keys positioned in close proximity to said left-hand group of dot keys and a right-hand group of four function keys positioned in close proximity to said right-hand group of dot keys;
   each function key of said left-hand group of four function keys being positioned above and in spaced apart relation to an associated dot key of said left-hand group of four dot keys to facilitate location of each of said four function keys;
   each function key of said left-hand group of four function keys and each function key of said right-hand group of function keys having a point-like structure to distinguish it from said flat, generally rectangular structure of said dot keys;
   each function key of said right-hand group of four function keys being positioned above and in spaced apart relation to an associated dot key of said right hand group of four dot keys to facilitate location of each of said function keys of said right-hand group of four function keys;
   a cursor router key positioned between said left-hand group of four dot keys and said right-hand group of four dot keys in side-by-side alignment therewith so that a user can access said cursor router key with a left band or a right hand without reaching above or below the dot keys.

2. A Braille input device, comprising:
   a left-hand group of four dot keys aligned substantially in side-by-side relation to one another in a single left row and a right-hand group of four dot keys aligned substantially in side-by-side relation to one another in a single row, said single left row and said single right row being in substantial left-to-right alignment with one another for inputting dot information for forming Braille characters;
   each dot key of said left-hand group and said right-hand group having a flat, generally rectangular structure;
   a Braille display including a plurality of Braille cells positioned in a row;
   a left-hand group of four function keys positioned in close proximity to said plurality said left-hand group of four dot keys and a right-hand group of four function keys positioned in close proximity to said right-hand group of four dot keys;
   each function key of said left-hand group of four function keys being positioned above and in spaced apart relation to an associated dot key of said left-hand group of four dot keys to facilitate location of each of said four function keys of said left-hand group of said four function keys;
   each function key of said left-hand group of function keys and each function key of said right-hand group of function keys having a point-like structure to distinguish it from said flat, generally rectangular structure of said dot keys;
   each function key of said right-hand group of four function keys being positioned above and in spaced apart relation to an associated dot key of said right-hand group of four dot keys to facilitate location of each of said four function keys of said right-hand group of four function keys;

a cursor router key being positioned between said left-hand group of four dot keys and said right-hand group of four dot keys in side-by-side alignment therewith so that a user can access said cursor router key with a left hand or a right hand without reaching above or below the dot keys.

* * * * *